United States Patent Office 3,586,673
Patented June 22, 1971

3,586,673
PREPARATION OF SYMMETRICALLY AND UNSYMMETRICALLY SUBSTITUTED STILBENE-BISBENZOXAZOLES
Melvin S. Bloom, Rochester, N.Y., and James A. Hill, Dover, Del., assignors to Eastman Kodak Company, Rochester, N.Y.
No Drawing. Filed Feb. 5, 1968, Ser. No. 702,830
Int. Cl. C09b 23/00
U.S. Cl. 260—240
5 Claims

ABSTRACT OF THE DISCLOSURE

Process for the preparation of both symmetrical and unsymmetrical 4,4'-substituted stilbene derivatives, having 2-benzoxazolyl, 2-benzimidazolyl, or 2-benzothiazolyl substituents. The process comprises first reacting a dialkyl 4-substituted benzylphosphonate with a 4-substituted benzaldehyde to form the corresponding 4-heterocyclic-4'-carbonylstilbene compound, which is then treated with an acyl halogenating agent to form the 4-heterocyclic-4'-stilbenecarbonyl halide. The halide is then reacted with an o-amino-phenylene compound to form the subject stilbene derivatives. These stilbene derivatives are useful as optical brighteners.

This invention is concerned with a new process for the preparation of 4,4'-diheterocyclic substituted derivatives of stilbene, which are particularly useful as fluorescent brightening agents and light stabilizers for thermoplastic materials.

More specifically, the novel process of this invention is concerned with the preparation of 4,4'-diheterocyclic substituted stilbene derivatives which correspond to the general formula:

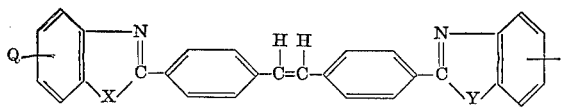

wherein X and Y, which may be the same or different, are members selected from the group consisting of —NR$_1$—, —O—, and —S—, wherein R$_1$ is a member selected from the group consisting of hydrogen, alkyl and aryl; and Q and Z, which may be the same or different, are members selected from the group consisting of hydrogen, alkyl, alkenyl, alkoxy, aryl, aryloxy, halo, cyano, and sulfonyl.

The subject process provides a simple method for the preparation of either the symmetrical or unsymmetrical members of the stilbene series in high yields. Exemplary of this process, as described herein, is the preparation of 2 - [p-[p-(2' - benzoxazolyl)styryl]phenyl]-5-methylbenzoxazole from 4 - methyl - 2-aminophenol, p-carboxybenzaldehyde, and diethyl 4 - (2' - benzoxazolyl)benzylphosphonate.

As is apparent from the above, and as is more thoroughly exemplified hereinafter, the process of this invention may be used to prepare the 4,4'-diheterocyclic substituted stilbene derivatives wherein the 4,4'-heterocyclic substituents are either the same or different. Thus, by the subject process, unsymmetrical members of all types of this series of compounds, for example, 2 - [p-[p-(2'-benzoxazolyl)styryl]phenyl]benzothiazole and 2 - [p-[p-(2'-benzothiazolyl)styryl]phenyl]benzimidazole, may be prepared, as well as the symmetrical members of these types of compounds, such as 4,4'-bis(2'-benzoxazolyl)stilbene, and 4,4'-bis(2'-benzothiazolyl)stilbene. Heretofore, the preparative methods of the prior art have provided, principally, for the preparation of only the symmetrical members of these types of compounds.

In essence, the process of the present invention comprises three main steps, the first of which involves the interaction of a dialkyl 4-substituted benzylphosphonate corresponding to the general formula:

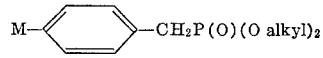

wherein M is a member selected from the group consisting of —CO$_2$R$_2$ and

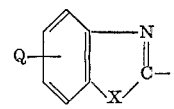

wherein R$_2$ is a member selected from the group consisting of hydrogen, alkyl, and aryl, and X and Q have the meanings given above, with a 4-substituted benzaldehyde corresponding to the general formula:

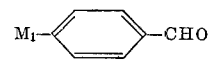

wherein M$_1$ has the meaning of M, above, with the provision that M and M$_1$ must be different. This interaction is conducted in the presence of a suitable proton acceptor, such as sodium hydride and an inert solvent, and the results in the formation of a 4 - heterocyclic-4'-carbonylstilbene compound corresponding to the general formula:

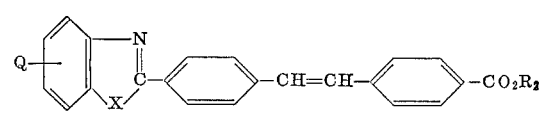

The second step of the subject process involves the treatment of the stilbenecarboxylic acid corresponding to the above general formula with an acyl halogenating agent such as phosphorus oxychloride, under halogenating conditions to form the corresponding 4-heterocyclic-4'-stilbenecarbonyl halide. The third step consists of the treatment of approximately equal molar quantities of the above formed stilbenecarbonyl halide with an o-aminophenylene compound corresponding to the general formula:

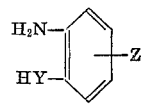

wherein Y and Z have the meanings given above, under conditions sufficient to effect condensation and cyclization, with the formation of the subject 4,4'-diheterocyclic substituted stilbene derivatives. Each of these steps in the subject process is discussed more fully below.

The class of stilbene derivatives which are prepared by the subject process have unexpectedly superior fluorescent properties when used as whitening or brightening agents and, in addition, have certain other properties, such as heat stability, light stability, stability towards bleaches, stability in textile processing treatments and the like, which make them especially useful as whitening or brightening agents for textile materials, particularly for synthetic linear polyester textile fibers. Further information as to these known compounds and their uses may be found in the prior art, such as Belgian Pat. 648,674, Belgian Patent 651,310, and U.S. Pats. 3,260,715 and 3,322,680.

A better understanding of the process and products of this invention may be obtained from the examples given below, which disclose preferred modes presently contemplated by the inventors for carrying out this invention.

EXAMPLE 1

Diethyl p-(2-benzoxazolyl)benzylphosphonate is prepared by refluxing a solution of 29 g. (0.1 mole) of 2-(α-bromo-p-tolyl)benzoxazole in 150 ml. of triethyl phosphite for a period of 5 hours. The excess triethyl phosphite is removed in vacuo and about 25 g. of product is obtained. The diethyl p-(2-benzoxazolyl)benzylphosphonate obtained, both before and after recrystallization from hexane, melts at 67–68° C.

A solution containing 0.04 mole of methylsulfinyl carbanion prepared from sodium hydride in 15 ml. of dimethyl sulfoxide is cooled in an ice bath, and, after cooling, a solution of 6.90 g. (0.02 mole) of diethyl p-(2-benzoxazolyl)benzylphosphonate and 3.20 g. (0.02 mole at 94% assay) of p-carboxybenzaldehyde in 100 ml. of 1:1 dimethyl sulfoxide-tetrahydrofuran is slowly added over a period of two hours. The reaction mixture is stirred during the two hour addition period and for a period of approximately 30 minutes after completion of the addition. The mixture is then poured into 200 ml. of acetone, the product isolated, washed with acetone and dried. The yield of sodium 4-(2'-benzoxazolyl)-4'-stilbenecarboxylate is 7.27 g. (84% of theory).

The sodium salt is slurried in 10% hydrochloric acid and heated gently. After 1 hour, the solid is collected, washed free of acid and dried. After recrystallization of the 4-(2'-benzoxazolyl)-4'-stilbenecarboxylic acid from 1,2,4-trichlorobenzene, the acid has a liquid-crystal transition at 356°–363° C. and melts at 365°–370° C.

4-(2-benzoxazolyl)-4'-stilbenecarboxylic acid (1.71 g., 0.005 mole) is treated with 0.85 g. (0.0055 mole) of phosphorus oxychloride in 1,2,4-trichlorobenzene, and is refluxed for one hour to form the corresponding acid chloride. After the formation of the acid chloride, 0.62 g. (0.005 mole) of 4-methyl-2-aminophenol is added and refluxing continued for an additional two hours. The mixture is cooled, filtered and the yellow product, 2-[p-[p-(2'-benzoxazolyl)styryl]phenyl]-5-methylbenzoxazole, is washed with benzene, and recrystallized three times from 1,2,4-trichlorobenzene. The recrystallized, purified material has the following melting behavior: it shrinks at 268° C., has a liquid-crystal transition 320°–325° C., and melts at 384°–387° C.

*Analysis.*—Calcd. for $C_{29}H_{20}N_2O_2$ (percent): C, 81.28; H, 4.71; N, 6.54. Found (percent): C, 80.77; H, 4.68; N, 6.30.

EXAMPLES 2 to 11

Following the general procedure of Example 1, solutions of 0.1 mole of each of the following halides:

2-(α-bromo-p-tolyl)-6-styrylbenzoxazole;
2-(α-bromo-p-tolyl)-5-biphenylylbenzoxazole;
2-(α-bromo-p-tolyl)-7-m-xylylbenzimidazole;
2-(α-bromo-p-tolyl)-4-o-tolylbenzimidazole;
2-(α-bromo-p-tolyl)-5-amylsulfonylbenzimidazole;
2-(α-bromo-p-tolyl)-5-ethoxybenzoxazole;
2-(α-chloro-p-tolyl)-6-decoxybenzimidazole;
2-(α-chloro-p-tolyl)6-bromobenzothiazole;
2-(α-chloro-p-tolyl)-6-ethylsulfonylbenzothiazole; and
2-(α-chloro-p-tolyl)-5-dodecylbenzimidazole in 150 ml. of triethyl phosphite are refluxed for about 5 hours. After removal of the excess triethyl phosphite by distillation, the following corresponding benzylphosphonates are obtained:

diethyl 4-(6'-styryl-2'-benzoxazolyl)benzylphosphonate;
diethyl 4-(5'-p-biphenylyl-2'-benzoxazolyl)benzylphosphonate;
diethyl 4-(7'-m-xylyl-2'-benzimidazolyl)benzylphosphonate;
diethyl 4-(4'-o-tolyl-2'-benzimidazolyl)benzylphosphonate;
diethyl 4-(5'-amylsulfonyl-2'-benzimidazolyl)benzylphosphonate;
diethyl 4-(5'-ethoxy-2'-benzoxazolyl)benzylphosphonate;
diethyl 4-(6'-decoxy-2'-benzimidazolyl)benzylphosphonate;
diethyl 4-(6'-bromo-2'-benzothiazolyl)benzylphosphonate;
diethyl 4-(6'-ethylsulfonyl-2'-benzothiazolyl)benzylphosphonate; and
diethyl 4-(5'-dodecyl-2'-benzimidazolyl)benzylphosphonate.

Solutions of 0.02 mole of each of the above phosphonates and 0.02 mole of p-carboxybenzaldehyde in 100 ml. of 1:1 dimethyl sulfoxide-tetrahydrofuran are slowly added to solutions of 0.04 mole of methylsulfinyl carbanion in 15 ml. of dimethyl sulfoxide, and the resulting products are isolated in accordance with the procedure of Example 1. Good yields of the following corresponding stilbenecarboxylic acids are obtained:

4-(6'-styryl-2'-benzoxazolyl)-4'-stilbenecarboxylic acid;
4-(5'-p-biphenylyl-2'-benzoxazolyl)-4'-stilbenecarboxylic acid;
4-(7'-m-xylyl-2'-benzimidazolyl)-4'-stilbenecarboxylic acid;
4-(4'-o-tolyl-2'-benzimidazolyl)-4'-stilbenecarboxylic acid;
4-(5'-amylsulfonyl-2'-benzimidazolyl)-4'-stilbenecarboxylic acid;
4-(5'-ethoxy-2'-benzoxazolyl)-4'-stilbenecarboxylic acid;
4-(6'-decoxy-2'-benzimidazolyl)-4'-stilbenecarboxylic acid;
4-(6'-bromo-2'-benzothiazolyl)-4'-stilbenecarboxylic acid;
4-(6'-ethylsulfonyl-2'-benzothiazolyl)-4'-stilbenecarboylic acid; and
4-(5'-dodecyl-2'-benzimidazolyl)-4'-stilbenecarboxylic acid.

Each of the above stilbenecarboxylic acids is treated with phosphorus oxychloride as in Example 1 to form the corresponding acid chlorides, after which 0.02 mole of each of the following o-aminophenylene compounds, respectively, is added to each of the above formed acid chlorides:

4-t-butyl-2-aminophenol;
4-phenyl-2-aminophenol;
5-chloro-2-aminophenol;
5-cyano-2-aminophenol;
5-methoxy-2-aminophenol;
N-phenyl-6-phenoxy-o-phenylenediamine;
N-m-tolyl-4-(1'-naphthyl)-o-phenylenediamine;
4-benzhydryl-2-aminothiophenol;
6-octyl-2-aminothiophenol; and
4-(o-bromophenyl)-2-aminophenol, and the following corresponding fluorescent compounds are formed and isolated:

(2) 2 - [p-[p-(5'-t-butyl-2'-benzoxazolyl)styryl]phenyl]-6-styrylbenzoxazole;
(3) 2 - [p-[p-(5'-phenyl-2'-benzoxazolyl)styryl]phenyl]-5-p-biphenylylbenzoxazole;
(4) 2-[p-[p-(6'-chloro-2'-benzoxazolyl)styryl]phenyl]-7-m-xylylbenzimidazole;
(5) 2-[p-[p-(6'-cyano-2'-benzoxazolyl)styryl]phenyl]-4-o-tolylbenzimidazole;
(6) 2-[p-[p-(6'-methoxy-2'-benzoxazolyl)styryl]phenyl]-5-amylsulfonylbenzimidazole;
(7) 1-phenyl-2-[p-[p-(5'-ethoxy-2'-benzoxazolyl)styryl]phenyl]-7-phenoxybenzimidazole;
(8) 1-m-tolyl-2-[p-[p-(6'-decoxy-2'-benzimidazolyl)styryl]phenyl]-5-(1'-naphthyl)benzimidazole;
(9) 2-[p-[-(6'-bromo-2'-benzothiazolyl)styryl]phenyl]-5-benzhydrylbenzothiazole;
(10) 2-[p-[p-(7'-octyl-2'-benzothiazolyl)styryl]-phenyl]-6-ethylsulfonylbenzothiazole; and

(11) 2-[p-[p-(5'-o-bromophenyl-2'-benzoxazolyl)
styryl]phenyl]-5-dodecylbenzimidazole.

EXAMPLE 12

A solution is prepared containing 0.01 mole of methylsulfinyl carbanion in 10 ml. of dimethyl sulfoxide and cooled in an ice bath. A solution of 3.45 g. (0.01 mole) of diethyl p-(2-benzoxazolyl)benzylphosphonate and 1.80 g. (0.011 mole) of p-methoxycarbonylbenzaldehyde in 50 ml. of 1:1 dimethyl sulfoxide-tetrahydrofuran is added dropwise to the cooled carbanion solution over a period of about 2 hours. At the end of the addition, the mixture is poured into 100 ml. of acetone, filtered, washed with acetone and dried. The solid, methyl 4-(2'-benzoxazolyl)-4'-stilbenecarboxylate, twice recrystallized from o-dichlorobenzene, has a liquid-crystal transition at 233° C. and melts at 261°–262° C.

*Analysis.*—Calcd. for $C_{23}H_{17}NO_3$ (percent): C, 77.72; H, 4.83; N, 3.94. Found (percent): C, 77.81; H, 4.88; N, 3.87.

A solution of 5.1 g. of the above ester in 125 ml. of dimethylformamide containing 5 ml. of 50% sodium hydroxide is refluxed for 8 hours, cooled and filtered. The residue is washed with dimethylformamide, water and acetone. The sodium 4-(2'-benzoxazolyl)-4'-stilbenecarboxylate thus obtained is acidified with warming to obtain the corresponding acid, which is recrystallized twice from o-di-chlorobenzene. The acid has a liquid-crystal transition at 359°–363° C., and a melting point of 363°–368° C.

*Analysis.*—Calcd. for $C_{22}H_{15}NO_3$ (percent): C, 77.40; H, 4.44; N, 4.10. Found (percent): C, 76.94; H, 4.51; N, 3.65.

EXAMPLES 13 TO 21

Following the general procedure of Example 12, solutions of 0.01 mole of methylsulfinyl carbanion in 10 ml. of dimethylsulfoxide are prepared and cooled. Solutions containing 0.011 mole of p-methoxycarbonylbenzaldehyde and 0.01 of each of the following:

diethyl 4-(5'-benzyl-2'-benzimidazolyl)benzyl-
  phosphonate;
diethyl 4-(4'-octyl-2'-benzoxazolyl)benzylphosphonate;
diethyl 4-(6'-cyano-2'-benzoxazolyl)benzylphosphonate;
diethyl 4-(7'-octadecyl-2'-benzothiazolyl)benzyl-
  phosphonate;
diethyl 4-(6'-cyclohexyl-2'-benzimidazolyl)benzyl-
  phosphonate;
diethyl 4-(5'-chloro-2'-benzoxazolyl)benzylphosphonate;
diethyl 4-(6'-isopropyl-2'-benzimidazolyl)benzyl-
  phosphonate;
diethyl 4-(7'-phenyl-2'-benzothiazolyl)benzyl-
  phosphonate; and
diethyl 4-(6'-fluoro-2'-benzothiazolyl)benzylphosphonate in 50 ml. of 1:1 dimethyl sulfoxide-tetrahydrofuran are then added dropwise to the cooled carbanion solutions over a period of about two hours. The reaction mixture is worked as in Example 12 and the following corresponding methyl esters are isolated:

methyl 4-(5'-benzyl-2'-benzimidazolyl)-4'-stilbene-
  carboxylate;
methyl 4-(4'-octyl-2'-benzoxazolyl)-4'-stilbene-
  carboxylate;
methyl 4-(6'-cyano-2'-benzoxazolyl)-4'-stilbene-
  carboxylate;
methyl 4-(7'-octadecyl-2'-benzothiazolyl)-4'-stilbene-
  carboxylate;
methyl 4-(6'-cyclohexyl-2'-benzimidazolyl)-4'-stilbene-
  carboxylate;
methyl 4-(5'-chloro-2'-benzoxazolyl)-4'-stilbene-
  carboxylate;
methyl 4-(6'-isopropyl-2'-benzimidazolyl)-4'-stilbene-
  carboxylate;
methyl 4-(7'-phenyl-2'-benzothiazolyl)-4'-stilbene-
  carboxylate; and
methyl 4-(6'-fluoro-2'-benzothiazolyl)-4'-stilbene-
  carboxylate.

Saponification of each of these esters with 50% aqueous sodium hydroxide in dimethylformamide as in Example 12, and subsequent acidification and isolation, give good yields of the corresponding acids.

Solutions of 0.005 mole each of the above formed acids in 1,2,4-trichlorobenzene are treated with a slight molar excess of phosphorus oxychloride as in Example 12, to form the corresponding acid chlorides, after which 0.005 mole of each of the following o-aminophenylene compounds are added to the respective acid chlorides:

3-(2'-butenyl)-o-phenylenediamine;
3-phenoxy-2-aminothiophenol;
6-benzylsulfonyl-2-aminophenol;
5-cyclohexyl-o-phenylenediamine;
4-benzhydryl-o-phenylenediamine;
5-p-xylyl-2-aminophenol;
6-trifluoromethyl-2-aminothiophenol;
4-vinyl-2-aminophenol; and
6-biphenylyl-2-aminothiophenol and the following corresponding solid, fluorescent compounds are formed, and isolated:

(13) 2-[p-[p-(5'-benzyl-2'-benzimidazolyl)styryl]
  phenyl]-5-(2'-butenyl)benzimidazole;
(14) 2-[p-[p-(4'-phenoxy-2'-benzothiazolyl)styryl]
  phenyl]-4-octylbenzoxazole;
(15) 2-[p-[p-(6'-cyano-2'-benzoxazolyl)styryl]phenyl]-
  7-benzylsulfonylbenzoxazole;
(16) 2-[p-[p-(7'-octadecyl-2'-benzothiazolyl)styryl]
  phenyl]-6-cyclohexylbenzoxazole;
(17) 2-[p-[p-(6'-cyclohexyl-2'-benzimidazolyl)styryl]
  phenyl]-5-benzhydrylbenzimidazole;
(18) 2-[p-[p-(5'-chloro-2'-benzoxazolyl)styryl]phenyl]-
  6-p-xylylbenzoxazole;
(19) 2-[p-[p-(7'-trifluoromethyl-2'-benzoxazolyl)styryl]
  phenyl]-6-isopropylbenzimidazole;
(20) 2-[p-[p-(7'-phenyl-2'-benzothiazolyl)styrly]
  phenyl]-5-vinylbenzoxazole; and
(21) 2-[p-[p-(6'-fluoro-2'-benzothiazolyl-styryl]
  phenyl]-7-biphenylylbenzothiazole.

EXAMPLE 22

Five grams of α-bromo-p-toluic acid (0.023 mole) are refluxed for about 2 hours with 50 ml. of triethyl phosphite. At the end of this reflux period, the excess triethyl phosphite and a fraction of diethyl ethylphosphonate are removed by distillation at reduced pressure. The residue is treated with benzene which causes it to solidify. This crude diethyl p-carboxybenzylphosphonate melts in the range of 118°–122° C.

Dimethyl sulfoxide (25 ml.) is added with stirring to 0.54 g. of sodium methoxide, followed by a solution of 1.36 g. of diethyl p-carboxybenzylphosphonate in 15 ml. of dimethyl sulfoxide. A slurry of 1.16 g. of p-(2-benzoxazolyl)benzaldehyde in 35 ml. of dimethyl sulfoxide is then slowly added to the above prepared methoxide—phosphonate solution, whereupon the yellow solution becomes red and then a yellow solid forms. After about 2 hours, this mixture is poured into water and filtered. The residue is slurried in water and acidified with warming to give the free acid, 4-(2'-benzoxazolyl)-4'-stilbenecarboxylic acid, whose infrared spectrum corresponds to that of the previously described acid.

The 4-(2'-benzoxazolyl)-4'-stilbenecarboxylic acid (1.71 g., 0.005 mole) is treated with 0.85 g. (0.0055 mole) of phosphorus oxychloride in 1,2,4-trichlorobenzene. This mixture is heated under reflux for 1 hour, after which 0.005 mole of 4-ethyl-2-aminophenol is added, and refluxing is continued for 2 hours. The mixture is cooled and filtered, and the yellow residue washed with benzene and recrystallized from 1,2,4-trichlorobenzene to give pure 2 - [p-[p-(2'-benzoxazolyl-styryl]phenyl]-5-ethylbenzoxazole.

EXAMPLES 23 to 32

Using the general procedure of Example 22, the following 4-substituted benzaldehydes are treated in dimethyl sulfoxide with sodium methoxide and diethyl p-carboxybenzylphosphonate:

4-(5'-phenoxy-2'-benzothiazolyl)benzaldehyde;
4-(7'-o-chlorophenyl-2'-benzothiazolyl)benzaldehyde;
4-(5'-p-toloxy-2'-benzoxazolyl)benzaldehyde;
4-(5'-propylsulfonyl-2'-benzoxazolyl)benzaldehyde;
4-(5'-p-biphenyloxy-2'-benzimidazolyl(benzaldehyde;
4-(6'-p-biphenyl-2'-benzimidazolyl)benzaldehyde;
4-(6'-allyl-2'-benzaxazolyl)benzaldehyde;
4-(7'-hexylsulfonyl-2'-benzoxazolyl)benzaldehyde;
4-(7'-cyclooctyl-2'-benzoxazolyl)benzaldehyde; and
4-(4'-trifluoromethyl-2'-benzothiazolyl)benzaldehyde.

The corresponding acids are obtained:

4-(5'-phenoxy-2'-benzothiazolyl)-4'-stilbenecarboxylic acid;
4-(7'-o-chlorophenyl-2'-benzothiazolyl)-4'-stilbenecarboxylic acid;
4-(5'-p-toloxy-2'-benzoxazolyl)-4'-stilbenecarboxylic acid;
4-(5'-propylsulfonyl-2'-benzoxazolyl)-4'-stilbenecarboxylic acid;
4-(5'-p-biphenyloxy-2'-benzimidazolyl)-5'-stilbenecarboxylic acid;
4-(6'-p-biphenyl-2'-benzimidazolyl)-4'-stilbenecarboxylic acid;
4-(6'-allyl-2'-benzoxazolyl)-4'-stilbenecarboxylic acid;
4-(7'-hexylsulfonyl-2'-benzoxazolyl)-4'-stilbenecarboxylic acid;
4-(7'-cyclooctyl-2'-benzoxazolyl)-4'-stilbenecarboxylic acid; and
4-(4'-trifluoromethyl-2'-benzothiazolyl)-4'-stilbenecarboxylic acid.

Each of the above stilbenecarboxylic acids is treated with phosphorus oxychloride as in Example 22 to form its corresponding acid chloride. An equal molar amount of each of the following o-aminophenylene compounds is then added to the respective acid chloride formed above:

N-ethyl-5-chloro-o-phenylenediamine;
5-decoxy-2-aminophenol;
5-methoxy-2-aminophenol;
7-dodecyl-2-aminothiophenol;
6-butylsulfonyl-o-phenylenediamine;
3-phenyl-2-aminophenol;
2-aminothiophenol;
6-chloro-2-aminophenol;
4-hexoxy-o-phenylenediamine; and
5-cyano-2-aminothiophenol, heated, and the following corresponding solid fluorescent compounds are formed, and isolated:

(23) 1-ethyl-2-[p-[p-(5'-phenoxy-2'-benzothiazolyl) styryl]phenyl]-6-chlorobenzimidazole;
(24) 2-[p-[p-(7'-o-chlorophenyl-2'-benzothiazolyl) styryl]phenyl]-5-decoxybenzoxazole;
(25) 2-[p-[p-(6'-methoxy-2'-benzoxazolyl)styryl] phenyl]-6-p-toloxybenzoxazole;
(26) 2-[p-[p-(7'-dodecyl-2'-benzothiazolyl)styryl] phenyl]-5-propylsulfonylbenzoxazole;
(27) 2-[p-[p-(5'-p-biphenyloxy-2'-benzimidazolyl) styryl]phenyl]-7-butylsulfonylbenzimidazole;
(28) 2-[p-[p-(4'-phenyl 2'-benzoxazolyl)styryl]phenyl]-6-p-biphenylylbenzimidazole;
(29) 2-[p-[p-(2'-benzothiazolyl)styryl]phenyl]-6-allyl-benzoxazole;
(30) 2-[p-[p-(7'-chloro-2'-benzoxazolyl)styryl]phenyl] 7-hexylsulfonylbenzimidazole;
(31) 2-[p-[p-(7'-cyclooctyl-2'-benzoxazolyl)styryl] phenyl]-5-hexoylbenzimidazole; and
(32) 2-[p-[p-(4'-trifluoromethyl-2'-benzothiazolyl) styryl]phenyl]-6-cycanobenzothiazole.

EXAMPLES 33 to 41

Using p-carboxybenzaldehyde as in Example 1, or p-methoxycarbonylbenzaldehyde as in Example 12, the following stilbenes are prepared. The yellow fluorescent compound, 2-[p-[p-(5'-phenyl - 2' - benzoxazolyl)styryl] phenyl] - 5 - cyanobenzoxazole is prepared from diethyl 4 - (5' - cyano - 2' - benzoxazolyl)benzylphosphonate and 4-phenyl-2-aminophenol; the yellow colored and yellow fluorescent compound, 2 - [p - [p - 6' - methoxy - 2'-benzoxazolyl)styryl]phenyl] - 5 - cyanobenzoxazole is prepared from diethyl 4 - (5' - cyano - 2' - benzoxazolyl) benzylphosphonate and 5 - methoxy - 2 - aminophenol; the yellow colored compound (with a greenish-yellow fluorescence), 2 - [p - [p - (5' - methyl - 2' - benzoxazolyl) styryl]phenyl] - 5 - cyanobenzoxazole is prepared from diethyl-4-(5' - cyano - 2' - benzoxazolyl)benzylphosphonate and 4 - methyl - 2 - aminophenol; the pale yellow colored compound having a strong yellow fluorescence, 2-[p - [p - (5' - phenyl - 2' - benzoxazolyl)styryl]phenyl]-5-methylsulfonylbenzoxazole is prepared from diethyl 4-(5'-phenyl - 2' - benzoxazolyl)benzylphosphonate and 4-methylsulfonyl - 2 - aminophenol; the deep yellow compound with a strong yellow fluorescence 2 - [p - [p - (2'-benzothiazolyl)styryl]phenyl] - 5 - phenylbenzoxazole is prepared from diethyl 4 - (5' - phenyl - 2' - benzoxazolyl) benzylphosphonate and 2-aminothiophenol; the yellow, strongly fluorescent compound, 2 - [p-[p-(5'-phenyl-2-benzoxazolyl)styryl]phenyl]benzimidazole is prepared from diethyl 4 - (5' - phenyl - 2' - benzoxazolyl)benzylphosphonate and o-phenylenediamine; the yellow compound, with strong yellow fluorescence, 2-[p-[p-(2'-benzoxazolyl)styryl]phenyl] - 5 - t - butylbenzoxazole is prepared from diethyl 4 - (2' - benzoxazolyl)benzylphosphonate and 4-t-butyl - 2 - aminophenol; the strongly yellow fluorescent and yellow colored compound, 2-[p-[p-(2'-benzoxazolyl)styryl]phenyl] - 5 - phenylbenzoxazole is prepared from diethyl 4 - (2' - benzoxazolyl)benzylphosphonate and 4-phenyl-2-aminophenol; and the yellow product exhibiting a strong yellow fluorescence, 2-[p-[p-(2' - benzoxazolyl)styryl]phenyl] - 5 - chlorobenzoxazole is prepared from diethyl 4-(2'-benzoxazolyl)benzylphosphonate and 5-chloro-2-aminophenol.

EXAMPLE 42

2 - amino - 4 - chlorophenol (14.4 g., 0.1 mole) and 13.6 g. (0.1 mole) of p-toluic acid are mixed with 100 g. of polyphosphoric acid and heated in the range of 240°–250° C. for 4 hours. The mixture is then poured into water and the solid product recovered by filtration. After recrystallization from ethanol a yield of 11.3 g. of 5-chloro-2-p-tolylbenzoxazole, M.P. 139–139.5° C., is obtained.

*Analysis.*—Calcd. for $C_{14}H_{10}ClNO$ (percent): C, 68.99; H, 4.14; N, 5.75. Found (percent): C, 69.06; H, 4.03; N, 5.30.

5 - chloro - 2 - p - tolylbenzoxazole (5.23 g.), 4.10 g. of N-bromosuccinimide and 0.22 g. of dibenzoyl peroxide are combined in 200 ml. of carbon tetrachloride and refluxed for about 6 hours. The solvent is then evaporated and the residue extracted with ethanol. The residue is then recrystallized from chlorobenzene to obtain purified 2-(α-bromo - p - tolyl) - 5 - chlorobenzoxazole M.P. 197° C.

*Analysis.*—Calcd. for $C_{14}H_9BrClNO$ (percent): C, 52.12; H, 2.82. Found (percent): C, 51.54; H, 2.63

2 - (α - bromo - p - tolyl) - 5 - chlorobenzoxazole (0.02 mole) is refluxed for about 2 hours with 50 ml. of triethyl phosphite. At the end of this period, the excess triethyl phosphite and diethyl ethylphosphonate is removed by distillation. The residue is treated with benzene, which causes the crude, diethyl p - (5 - chloro - 2 -benzoxazolyl) benzylphosphonate to solidify.

A solution containing 0.01 mole of diethyl p-(5-chloro-2 - benzoxazolyl)benzylphosphonate and 0.01 mole of p-carboxybenzaldehyde in 50 ml. of 1:1 dimethyl sulfoxide-tetrahydrofuran is slowly added over a period of 2 hours to a cold solution of 0.02 mole of methylsulfinyl carbanion in 10 ml. of dimethyl sulfoxide. The reaction mixture is stirred during the addition period and for about 30 minutes after completion of the addition. The mixture is then poured into 100 ml. of acetone, the product isolated, washed with acetone and dried. The sodium 4-(5'-chloro-2' - benzoxazolyl) - 4' - stilbenecarboxylate thus obtained is slurried in 10% hydrochloric acid and heated gently. After 1 hour, the solid is collected, washed free of acid and dried. A purified 4-(5'-chloro - 2' - benzoxazolyl-4'-stilbenecarboxylic acid is obtained after recrystallization from 1,2,4-trichlorobenzene.

Following the general procedure of Example 42, five 0.01 mole portions of 4-(5' - chloro - 2' - benzoxazolyl)-4'-stilbenecarboxylic acid are treated with phosphorus oxychloride to form the corresponding acid chloride. The following o-aminophenylene compounds are each treated with one of the portions of the so-formed acid chloride:

4-t-butyl-2-aminophenol;
4-cyano-2-aminophenol;
2-aminothiophenol;
4-phenyl-2-aminophenol; and
5-chloro-o-phenylenediamine.

After isolation and purification, good yields of the following solid, fluorescent compounds are obtained:

(43) 2-[p-[p-(5'-chloro-2'-benzoxazolyl)styryl]phenyl]-5-t-butylbenzoxazole;
(44) 2-[p-[p-(5'-chloro-2'-benzoxazolyl)styryl]phenyl]-5-cyanobenzoxazole;
(45) 2-[p-[p-(2'-benzothiazolyl)styryl]phenyl]-5-chlorobenzoxazole;
(46) 2-[p-[p-(5'-chloro-2'-benzoxazolyl)styryl]phenyl]-5-phenylbenzoxazole; and
(47) 2-[p-[p-(5'-chloro-2'-benzoxazolyl)styryl]phenyl]-6-chlorobenzimidazole.

Representative examples of the use of the compounds produced by the subject process as optional brighteners, whitening agents and light stablizers are as follows:

EXAMPLE 48

2-[p-[p-(2' - benzoxazolyl)styryl]phenyl] - 5 - methylbenzoxazole (0.020 g.) is dry mixed with 100 g. of poly(ethylene terephthalate) containing 0.35% titanium dioxide. The mixture is melted at 310° C. and extruded through a spinneret in the usual manner to produce fibers. These fibers have superior whiteness and light stability.

EXAMPLE 49

The use of poly(1,4-cyclohexylenediamethylene terephthalate), polypropylene, and nylon 66 as the base resin with the compounds 2-[p-[p-(2' - benzoxazolyl)styryl]phenyl]-5-methylbenzoxazole, and the process of Example 49, gives fibers of superior whiteness and light stability.

EXAMPLE 50

2-[p-[p-(2'-benzoxazolyl)styryl]phenyl]-5-chlorobenzoxazole (0.2 g.) is mixed with 100 g. of poly(ethylene terephthalate), and this mixture is then blended with 900 g. of poly(ethylene terephthalate) pellets. The resulting mixture is then extruded as a film at a feeding zone temperature of 265° C., a melt zone temperature of 295° C., and a die temperature of 270° C. The resulting film is oriented with 200% stretch (drafting and tentering) at 200° C., and then heat set at 220° C. The fluorescent-brightened film has superior whiteness and light stability.

EXAMPLE 51

2-[p-[p-(2'-benzoxazolyl)styryl]phenyl]-5-chlorobenzoxazole is solvent dispersed in poly(ethylene terephthalate) pellets (molding grade). The solvent is evaporated and the so-treated pellets are injection molded (550° F., 500 p.s.i.) into various shaped objects, which are fluorescent-brightened and have superior light stability.

The dialkyl 4-substituted benzylphosphonates which are one of the initial reactants of the subject process are conveniently prepared by means of the Michaelis-Arbuzov reaction or rearrangement. In essence, this reaction involves the interaction of a trialkyl phosphite and an alkyl halide with the formation of the corresponding phosphonic acid ester. This is a well known reaction and the exact experimental details and conditions needed to effect it may be found in the prior art, for example the review by Kosolapoff in Organic Reactions, VI, 276–338 (R. Adams, ed.) (J. Wiley, New York City, 1951), and the references cited therein.

The subject dialkyl benzylphosphonates may be prepared by the interaction of either a 4-heterocyclic benzyl halide or a 4-carboxy, or 4-alkoxy- or aryloxycarbonylbenzyl halide with an appropriate trialkyl phosphite under conditions of the Arbuzov reaction to form the corresponding dialkyl 4-heterocyclic benzylphosphonate, or the 4-carboxy, or 4-alkoxy- or aryloxycarbonylbenzylphosphonate.

The 4-heterocyclic benzyl halides used to prepare the dialkyl benzylphosphonates may be obtained by any of the conventional preparative methods for these types of halides. Thus, the corresponding 4-substituted toluenes may be halogenated in the presence of ultraviolet light, or the benzyl bromides may readily be prepared from the corresponding 4-heterocyclic toluene and N-bromosuccinimide (Wohl-Ziegler reaction), or by the catalytic halomethylation of the corresponding phenyl compound by a hydrogen halide and formaldehyde. The 4-carboxy, or 4-alkoxy- or aryloxycarbonylbenzyl halide, i.e., 4-halomethylbenzoic acid and its esters, may likewise be prepared by any of the conventional methods. One such method is that of Case in J. Am. Chem. Soc. 47, 3004 (1925), wherein 4-chloromethylbenzoic acid and 4-bromomethylbenzoic acid are prepared from the corresponding halo cyanides by refluxing with the appropriate halogen acid.

Numerous methods may be used to prepare the 4-heterocyclic substituted benzaldehydes used as one of the initial reactants in the subject process. Thus, one method involves the hydrolysis of the corresponding 4-substituted benzylidene halide. Other suitable preparative methods include the Gattermann-Koch reaction, which involves the formylation of the phenyl nucleus with carbon monoxide, the Gattermann reaction, which involves formylation of the phenyl nucleus with a cyano compound, formylation with N-methylformanilide, interaction of the corresponding 4-substituted benzyl halide with sodium 2-propanonitrile, Rosenmund reduction of the corresponding acyl chloride, and various types of Grignard reactions.

One particularly convenient and efficient method for the preparation of these 4-heterocyclic substituted benzaldehydes is by means of the reaction of the corresponding 4-substituted benzyl halide and hexamethylenetetramine to form the corresponding quaternary salt and its subsequent hydrolysis to the benzaldehyde. This preparative method is commonly known as the Sommelet reaction and further details as to its applicability to the specific preparation of these 4-substituted benzaldehydes may be found in the co-pending application of M. S. Bloom and E. U. Elam, Ser. No. 701,869, filed Jan. 31, 1968. A general discussion as to the conditions and methods of effecting the general Sommelet type reaction may be found in the review by S. J. Angyal in Organic Reactions (R. Adams, ed.) vol. VIII, pp. 197–217 [J. Wiley, New York (1954)].

The 4-carboxy, or 4-alkoxy- or aryloxycarbonyl benzaldehydes, i.e. terephthalaldehydic acid or esters, which may be used in one modification of this step, may be prepared by a variety of known methods. For example, terephthalaldehydic acid may be prepared according to the procedure of German Pat. 1,015,419 and its esters prepared according to standard, well known esterification procedures.

Further details as to these and other methods of preparing these 4-substituted benzaldehydes may be found in Wagner and Zook, Synthetic Organic Chemistry, pages 279–315 (J. Wiley & Sons, New York, 1953), T. N. Ferguson, Chem. Rev. 38, 227–254 (1946), and the review by E. Mossitig in Organic Reactions (R. Adams, ed.), vol. VIII, p. 218 (J. Wiley & Sons, New York, 1954), and the references cited therein.

The first step of the subject process involves the interaction of a dialkyl 4-substituted benzylphosphonate and a 4-substituted benzaldehyde in the presence of a suitable proton acceptor and is preferably conducted in a solution or suspension, whereby the corresponding 4-heterocyclic-4'-carbonylstilbene compound is formed.

The dialkyl 4-substituted benzylphosphonates and 4-substituted benzaldehydes reactants in this step have been defied above. Suitable proton acceptors include organometallic compounds, such as phenyl lithium, n-butyl lithium, triphenylmethyl sodium, ethyl magnesium bromide and the like, dissolved or suspended in solvents, such as tetrahydrofuran, diethyl ether, dimethylformamide, dimethyl sulfoxide, and the like. Another group of useful proton acceptors includes alkoxides, such as potassium t-butoxide, sodium ethoxide, sodium methoxide and the like. These may be used in the form of solutions dissolved in their corresponding alkanol or in another solvent such as benzene, dimethylformamide, dimethyl sulfoxide, and the like. A third group of useful proton acceptors includes inorganic compounds, such as sodium hydride, sodamide, metallic sodium, metallic potassium and the like, suspended in a suitable inert medium, such as xylene, benzene, ether, and the like. Another useful proton acceptor is the methylsulfinyl carbanion in dimethyl sulfoxide, prepared by the reaction of sodium hydride with dimethyl sulfoxide (Corey and Chaykovsky, J. Am. Chem. Soc. 87: 6, p. 1345 (1965).

It may, of course, be necessary in some instances where the substituents in either the heterocyclic or phenyl nucleus are sufficiently reactive, to block off the reactive function by the formation of a less reactive derivative, and subsequently to regenerate the original function after completion of the reaction. Since this type of procedure is well known to those skilled in the art, it will not be further discussed herein.

Among the inert solvents and/or suspending agents which may be used, there are included both polar solvents, such as dimethylformamide and dimethyl sulfoxide, and non-polar solvents, such as benzene, xylene, and dimethyl ether. Other solvents which may also be used include toluene and tetrahydrofuran.

As exemplified in the above examples, this interaction of the first step of the subject process may be conducted in a variety of different methods. One method of conducting this reaction is to add or mix the aldehyde with or without a suitable solvent or suspending agent to a solution or suspension of the phosphonate and the proton acceptor. Another method is to add a solution or suspension of the phosphonate and the aldehyde to the proton acceptor, or the reverse. The preferred exact procedure will depend upon the nature of the reactants and the products so formed. Usually, this step of the process is conducted in an ice bath or at ambient temperatures. However, it may be necessary to use a higher reaction temperature in certain cases. Reaction temperatures up to about 100° C. are useful, preferably up to about 70° C.

The separation of the 4-heterocyclic-4'-carbonylstilbene compound from the other products of the reaction may be accomplished in a variety of different methods. Since the organophosphorus product is a water-soluble phosphate, separation from the stilbene compound may be conveniently effected by the addition of water and separation of the water-soluble and -insoluble fractions, or the reaction mixture may be poured into a solvent such as acetone and the insoluble portion, the desired product, separated.

The second step of the subject process involves the acyl halogenation of the 4-heterocyclic-4'-stilbenecarboxylic acid formed in the preceding step, by means of an appropriate acyl halogenating agent. In general it has been found that the most suitable acyl halogenating agents for this step are the inorganic acid halides, such as thionyl chloride, phosphorus oxychloride, phosphorus pentachloride, phosphorus trichloride, and phosphorus tribromide.

Although the exact reaction conditions employed will depend upon the specific acyl halogenating agent used, in general the reaction conditions consist of reacting the acyl halogenating agent, preferably present in a slight molar excess, with the stilbenecarboxylic acid at either ambient or higher temperatures in the range of about 70° to 125° C., either in the presence or absence of a suitable inert solvent, and catalyst. If desired, the product acyl halide may be separated from the reaction mixture. However, as the above examples illustrate, the separation of the 4-heterocyclic-2'-stilbenecarbonyl halide product is not necessary, and in some instances not desirable. Thus, one convenient method of effecting this step and the subsequent step is to mix the 4-heterocyclic-4'-stilbenecarboxylic acid, the acyl halogenating agent, and the o-aminophenylene compound in a suitable liquid medium and to heat, for a short period of time at a moderate temperature range of up to about 125° C., whereby the acyl halide is formed and immediately condenses with the o-aminophenylene compound to form the corresponding amide. Further heating of this reaction mixture effects the cyclization step to yield the corresponding subject 4,4'-diheterocyclic substituted stilbene derivative. Such a combined procedure has the advantage of not requiring any separate isolation and purification of the various intermediates in this sequence of reactions.

When thionyl chloride is used as the acyl halogenating agent it is usually sufficient to treat a solution of the stilbenecarboxylic acid in a suitable inert solvent at steam-bath temperature, or at reflux to form the stilbenecarbonyl chloride, which may then be used directly in the next step. When phosphorus oxychloride is used as the halogenating agent, it is sufficient to reflux a solution of the stilbenecarboxylic acid and the phosphorus oxychloride in an inert solvent for an hour or more and then use this reaction mixture directly in the next step. Similar procedures are used with the other acyl halogenating agents.

The third step of the subject process involves the interaction of the 4-heterocyclic-4'-stilbenecarbonyl halide formed in step 2 with the o-aminophenylene compound under conditions sufficient to effect condensation, presumably to form the intermediate o-substituted amide, and then cyclization to form the subject 4,4'-diheterocyclic substituted stilbene derivative. In general, the conditions necessary to effect this interaction are heating the reaction mixture in a suitable inert solvent at a moderate temperature in the range of from about 70° to 125° C. to form the intermediate condensation product, the amide, followed by more prolonged heating in an inert solvent in a temperature range of about 180° to 220° C. to effect the cyclization step. As suitable liquid medium, a high-boiling inert organic solvent is preferred, for instance 1,2,4-trichlorobenzene, diphenyl ether, and alpha- or beta-methyl naphthalene.

Separation and purification of the final product, the 4,4'-diheterocyclic substituted stilbene derivative, is effected by any of the standard methods in the art applicable to separation and purification of solid materials. Thus, for example, the product stilbene derivatives may be purified by recrystallization from solvents such as 1-methyl-2-pyrrolidinone, 1,2,4-trichlorobenzene and the like, or by sublimation.

The o-aminophenylene compounds used in this step of the process, i.e., the o-phenylenediamines, the o-aminophenols, and the o-aminothiophenols are well known compounds which may be prepared by a variety of well known preparative methods. Specific reference to the preparation of some of those used in the example above include 4-phenyl-2-aminophenol [Bell, et al., J. Chem. Soc. 1926, 3047], 4-t-butylphenol-2-aminophenol [Anish, U.S. Pat. 2,429,178], 5-chloro-2-aminophenol [Mottier, Arch. Sci. Phys. Nat. 16, 301 (1934) (Chem. Abst. 29, 3322)], 4-cyano-2-aminophenol [Auwers et al., Chem. Ber. 30, 997], and 5-methoxy-2-aminophenol [Henrich, et al., Chem. Ber. 46, 3382]. The other o-aminophenylene compounds may be prepared by these and other well known methods of the prior art.

The term alkyl is used herein and in the appended claims to define alkyl radicals having from 1 to about 18 carbon atoms, while lower alkyl is used to define those having up to about 6 carbon atoms. Exemplary of alkyl radicals would be methyl, ethyl, propyl, isopropyl, n-butyl, isobutyl, n-pentyl, n-hexyl, decyl, dodecyl, hexadecyl, and octadecyl. Also included in the term alkyl are the corresponding unsaturated acylic hydrocarbon radicals, such as vinyl, allyl, 1-butenyl, 2-butenyl, 3-butenyl, 1-pentenyl, 2-pentenyl, 3-pentenyl, isobutenyl, 1-isopentenyl, 1,3-butadienyl, 2-butynylene, ethynyl, and the like. Cycloalkyl radicals having up to about 8 carbon atoms, such as cyclohexyl, cyclopropyl, cyclobutyl, cyclooctyl and the like, are also included in the terminology of alkyl. This terminology also includes substituted alkyl radicals, wherein inert substituents, such as aryl substituents, are present on the alkyl chain. Illustrative of these substituted alkyl radicals are benzyl, phenethyl, α-methylbenzyl, chlorobenzyl, 3-phenylpropyl, 1-naphthethyl, iodobenzyl, p-trifluoromethylbenzyl, and the like.

The term aryl is used in the specification and the appended claims as including both unsubstituted and substituted aryl radicals and heterocyclic radicals of an aromatic nature. Representative examples of these are phenyl, bromophenyl, methoxyphenyl, ethoxyphenyl, 1-naphthyl, 2-naphthyl, furyl, thienyl, anthryl, biphenylyl and the like.

The term alkoxy is used to define radicals of the type alk—O—, wherein "alk" is an alkyl radical as previously defined. Thus, the term alkoxy is used to define those having from 1 to about 18 carbon atoms. Typical examples of alkoxy radicals of this invention are ethoxy, propoxy, isopropoxy, n-butoxy, t-butoxy, pentoxy, benzyloxy, phenethoxy, 2-methylbenzyloxy, 1-butenoxy, 2-pentenoxy, allyloxy, cyclohexoxy, cyclooctoxy, 1,3-butadienoxy, hexadecoxy, dodecoxy, decoxy, p-trifluoromethylbenzyloxy and the like.

The term aryloxy is used herein to define radicals of the type ar—O—, wherein "ar" is an aryl radical as previously defined. Thus, representative examples of useful aryloxy groups are phenoxy, ethylphenoxy, xyloxy, bromophenoxy, methoxyphenoxy, chlorophenoxy, furyloxy, 1-naphthyloxy, 2-naphthyloxy, thienyloxy, anthryloxy, tolyloxy, biphenylyloxy, and the like.

The term sulfonyl is used herein and in the appended claims to define both the alkyl sulfonyl (alk—SO₂—) and aryl sulfonyl (ar—SO₂—) radicals. The alkyl portion may have from 1 to about 18 carbon atoms. Illustrative of these are methylsulfonyl, ethylsulfonyl, propylsulfonyl, isopropylsulfonyl, butylsulfonyl, t-butylsulfonyl, pentylsulfonyl, octylsulfonyl, decylsulfonyl, octadecylsulfonyl, pentadecylsulfonyl, undecylsulfonyl, cyclohexylsulfonyl, and the like. The aryl sulfonyl radicals are preferably mononuclear aryl sulfonyl radicals, such as phenylsulfonyl, tolylsulfonyl, chlorophenylsulfonyl, thiensulfonyl. However, polynuclear aryl sulfonyl radicals, such as biphenylylsulfonyl, naphthylsulfonyl, anthrylsulfonyl, chloronaphthylsulfonyl, ethylnaphthylsulfonyl, dimethylnaphthylsulfonyl and the like are useful.

The term halo is used herein and in the appended claims in its usual meaning to include the fluoro, chloro, bromo, and iodo radicals.

The invention has been described in considerable detail with particular reference to certain preferred embodiments thereof, but it will be understood that variations and modifications can be effected within the spirit and scope of the invention as described hereinabove, and as defined in the appended claims.

We claim:

1. Process for preparing a compound having the formula

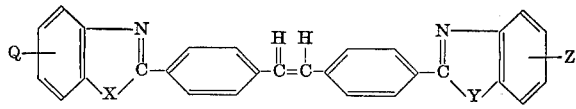

from a dialkyl benzylphosphonate corresponding to the formula

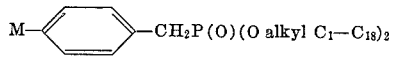

which comprises the steps of:
(a) contacting the dialkyl benzylphosphonate with a proton acceptor and a benzaldehyde which corresponds to the formula

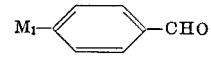

whereby the corresponding 4-heterocyclic-4'-carbonylstilbene compound is formed;

(b) contacting the 4-heterocyclic-4'-carbonylstilbene compound in its acid form with an acyl halogenating agent selected from the group consisting of thionyl chloride, phosphorus oxychloride, phosphorus pentachloride, phosphorus trichloride, and phosphorus tribromide, whereby the corresponding 4-heterocyclic-4'-stilbenecarbonyl halide is formed; and (c) heating to a temperature of between about 70° C. and about 220° C. a mixture of the 4-heterocyclic-4'-stilbenecarbonyl halide with an o-aminophenylene compound corresponding to the formula

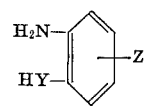

wherein:

X and Y are each —NR₁—, —O—, or —S—;

R₁ and R₂ are each hydrogen, alkyl from $C_1$ to $C_{18}$ or phenyl;

Q and Z are each hydrogen, alkyl from $C_1$ to $C_{18}$, alkoxy from $C_1$ to $C_{18}$, phenyl, phenoxy, ethylphenoxy, xyloxy, bromophenoxy, methoxyphenoxy, chlorophenoxy, halo, cyano, alkyl sulfonyl from $C_1$ to $C_{18}$, phenylsulfonyl, tolylsulfonyl, chlorophenylsulfonyl and thiensulfonyl;

M is a member selected from the group consisting of $CO_2R_2$; and

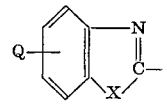

M₁ has the meaning of M above, with the provision that M and M₁ must be different radicals.

2. Process as recited in claim 1 wherein the dialkyl benzylphosphonate corresponds to the formula

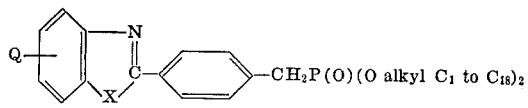

and the 4-substituted benzaldehyde corresponds to the formula

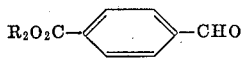

wherein:

Q is hydrogen, alkyl from $C_1$ to $C_{18}$, alkoxy from $C_1$ to $C_{18}$, phenyl, phenoxy, ethylphenoxy, xyloxy, bromophenoxy, methoxyphenoxy, chlorophenoxy, halo, cyano, alkyl sulfonyl from $C_1$ to $C_{18}$, phenylsulfonyl, tolylsulfonyl, chlorophenylsulfonyl or thiensulfonyl;

X is a member selected from the group consisting of $-NR_1-$, $-O-$, and $-S-$; and $R_1$ and $R_2$ are each hydrogen, alkyl from $C_1$ to $C_{18}$ or phenyl.

3. Process as recited in claim 1 wherein the dialkyl benzylphosphonate corresponds to the formula

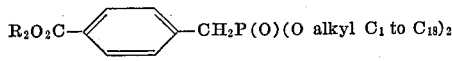

and the benzaldehyde corresponds to the formula

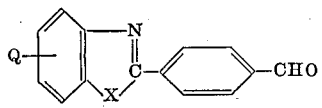

wherein:

Q is hydrogen, alkyl from $C_1$ to $C_{18}$, alkoxy from $C_1$ to $C_{18}$, phenyl, phenoxy, ethylphenoxy, xyloxy, bromophenoxy, methoxyphenoxy, chlorophenoxy, halo, cyano, alkyl sulfonyl from $C_1$ to $C_{18}$, phenylsulfonyl, tolylsulfonyl, chlorophenylsulfonyl or thiensulfonyl;

X is a member selected from the group consisting of $-NR_1-$, $-O-$, $-S-$; and $R_1$ and $R_2$ are each hydrogen, alkyl from $C_1$ to $C_{18}$ or phenyl.

4. Process for preparing a 4,4'-diheterocyclic stilbene derivative as recited in claim 1 wherein the proton acceptor comprises a member selected from the group consisting of an organometallic compound, an alkoxide, an inorganic compound, and methylsulfonyl carbanion.

5. Process for preparing a 4,4'-diheterocyclic stilbene derivative as recited in claim 4 wherein the organometallic compound is selected from the group consisting of phenyl lithium, n-butyl lithium, triphenylmethyl sodium, and ethyl magnesium bromide; the alkoxide is selected from the group consisting of potassium t-butoxide, sodium ethoxide, and sodium methoxide; and the inorganic compound is selected from the group consisting of sodium hydride, sodamide, metallic sodium, and metallic potassium.

References Cited

UNITED STATES PATENTS 3,412,089  11/1968  Ohkawa et al. _____ 260—240

OTHER REFERENCES

Wadsworth et al., J. Am. Chem. Soc., vol. 83, pages 1733 to 1738 (1961).

Knott, J. Chem. Soc., 1965, pp. 3793 to 3795.

JOHN D. RANDOLPH, Primary Examiner

U.S. Cl. X.R.

252—301.2; 260—75, 304, 307, 309.2, 571, 578

PO-1050
(5/69)

UNITED STATES PATENT OFFICE
CERTIFICATE OF CORRECTION

Patent No. 3,586,673            Dated June 22, 1971

Inventor(s) Melvin S. Bloom and James A. Hill

It is certified that error appears in the above-identified patent and that said Letters Patent are hereby corrected as shown below:

Column 3, line 30, "4-(2-benzoxazolyl)-4'-stilbenecarboxylic" should read ---4-(2'-benzoxazolyl)-4'-stilbenecarboxylic---.

Column 4, line 72, "2-[p-[-(6'-bromo-2'-benzothiazolyl)styryl]-phenyl]-5-benzhydrylbenzothiazole" should read ---2-[p-[p-(6'-bromo-2'-benzothiazolyl)styryl]phenyl]-5-benzhydrylbenzothiazole ---.

Column 6, line 43, "(21" should read ---(21)---.

Column 6, line 43, "2-[p-[p-(6'-fluoro-2'-benzothiazolyl-styryl]phenyl]-7-biphenylylbenzothiazole" should read "2-[p-[p-(6'-fluoro-2'-benzothiazolyl)styryl]phenyl]-7-biphenylylbenzothiazole---.

Column 7, line 1, "2-[p-[p-(2'-benzoxazolyl-styryl]phenyl]-5-ethylbenzoxazole" should read "2-[p-[p-(2'-benzoxazolyl)styryl]-phenyl]-5-ethylbenzoxazole---.

Column 7, line 29, "4-(5'-p-biphenyloxy-2'-benzimidazolyl)-5'-stilbenecarboxylic acid" should read ---4-(5'-p-biphenyloxy-2'-benzimidazolyl)-4'-stilbenecarboxylic acid---.

Column 9, line 14, "4-(5'-chloro-2'-benzoxazolyl-4'-stilbene-carboxylic" should read ---"4-(5'-chloro-2'-benzoxazolyl)-4'-stilbenecarboxylic----.

Column 9, line 56, "compounds" should read ---compound---.

Column 14, Claim 1, the first formula should read as follows:

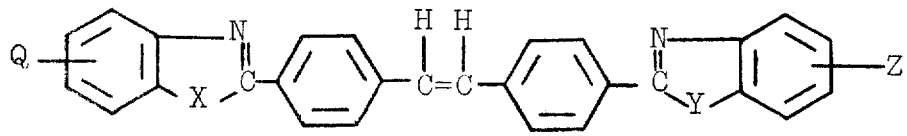

Signed and sealed this 25th day of January 1972.

(SEAL)
Attest:

EDWARD M. FLETCHER, JR.
Attesting Officer

ROBERT GOTTSCHALK
Commissioner of Patents